US012755973B2

(12) United States Patent

Shen et al.

(10) Patent No.: US 12,755,973 B2
(45) Date of Patent: Oct. 6, 2026

(54) ARTIFICIAL GRAPHITE AND PREPARATION METHOD THEREOF, SECONDARY BATTERY CONTAINING SUCH ARTIFICIAL GRAPHITE, AND ELECTRIC APPARATUS

(71) Applicant: CONTEMPORARY AMPEREX TECHNOLOGY (HONG KONG) LIMITED, Hong Kong (CN)

(72) Inventors: Rui Shen, Ningde City (CN); Libing He, Ningde City (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/319,500

(22) Filed: May 18, 2023

(65) Prior Publication Data

US 2023/0307644 A1 Sep. 28, 2023

Related U.S. Application Data

(63) Continuation of application No. PCT/CN2021/141077, filed on Dec. 24, 2021.

(51) Int. Cl.
*H01M 4/587* (2010.01)
*C01B 32/205* (2017.01)
(Continued)

(52) U.S. Cl.
CPC ........... *H01M 4/587* (2013.01); *C01B 32/205* (2017.08); *C01B 32/21* (2017.08); (Continued)

(58) Field of Classification Search
None
See application file for complete search history.

(56) References Cited

U.S. PATENT DOCUMENTS

2009/0214954 A1 8/2009 Onishi et al.
2019/0260019 A1* 8/2019 Jung ..................... H01M 4/587
(Continued)

FOREIGN PATENT DOCUMENTS

CN 103811758 A 5/2014
CN 107871854 A 4/2018
(Continued)

OTHER PUBLICATIONS

English translation of He et al. CN 111834634 (Year: 2020).*
(Continued)

*Primary Examiner* — Ronak C Patel
(74) *Attorney, Agent, or Firm* — K&L Gates LLP

(57) ABSTRACT

An artificial graphite material A. The artificial graphite material A is secondary particles are provided. In some embodiments, a surface roughness $\eta_A$ of the artificial graphite material A satisfies $6\leq\eta_A\leq12$. This application further provides an artificial graphite material B. The artificial graphite material B is primary particles, where a surface roughness $\eta_B$ of the artificial graphite material B satisfies $2.5\leq\eta_B\leq5$. This application further provides a secondary battery containing the artificial graphite material A and/or the artificial graphite material B and an electric apparatus. The secondary battery provided by this application can have high energy density and long service life.

9 Claims, 2 Drawing Sheets

5

(51) Int. Cl.
*C01B 32/21* (2017.01)
*H01M 4/02* (2006.01)

(52) U.S. Cl.
CPC ...... *C01P 2004/61* (2013.01); *C01P 2006/10* (2013.01); *C01P 2006/11* (2013.01); *C01P 2006/12* (2013.01); *C01P 2006/42* (2013.01); *C01P 2006/90* (2013.01); *H01M 2004/021* (2013.01)

(56) References Cited

U.S. PATENT DOCUMENTS

| | | | | |
|---|---|---|---|---|
| 2020/0091519 | A1* | 3/2020 | Zhou | H01M 10/0525 |
| 2020/0227746 | A1* | 7/2020 | Wang | H01M 4/133 |
| 2021/0313575 | A1 | 10/2021 | Shen et al. | |

FOREIGN PATENT DOCUMENTS

| | | | |
|---|---|---|---|
| CN | 110642247 | A | 1/2020 |
| CN | 111052466 | A | 4/2020 |
| CN | 111646466 | A | 9/2020 |
| CN | 112670472 | A | 4/2021 |
| EP | 1361194 | A1 | 11/2003 |
| EP | 3923387 | A1 | 12/2021 |
| JP | 2002110233 | A | 4/2002 |
| JP | 2003132889 | A | 5/2003 |
| JP | 2004134244 | A | 4/2004 |
| JP | 2020107405 | A | 7/2020 |
| JP | 2020167153 | A | 10/2020 |
| WO | 2012137770 | A1 | 10/2012 |
| WO | 2019031543 | A1 | 2/2019 |
| WO | 2020137909 | A1 | 7/2020 |
| WO | 2021108981 | A1 | 6/2021 |
| WO | 2021108982 | A1 | 6/2021 |
| WO | 2021108983 | A1 | 6/2021 |

OTHER PUBLICATIONS

International Search Report received in the corresponding International Application PCT/CN2021/141077, mailed Jul. 29, 2022.

The Extended European Search Report received in the corresponding European Application 21942131.0, mailed Jan. 23, 2024.

Notice of Reasons for Refusal received in the corresponding Japanese Application 2023-502709, mailed Mar. 1, 2024.

Office Action, mailed Apr. 7, 2026, for corresponding Indian Patent Application Serial No. 202317014181.

* cited by examiner

ARTIFICIAL GRAPHITE AND PREPARATION METHOD THEREOF, SECONDARY BATTERY CONTAINING SUCH ARTIFICIAL GRAPHITE, AND ELECTRIC APPARATUS

CROSS-REFERENCE TO RELATED APPLICATIONS

The present application is a continuation of International Application PCT/CN2021/141077, filed Dec. 24, 2021 and entitled "ARTIFICIAL GRAPHITE AND PREPARATION METHOD THEREOF, SECONDARY BATTERY CONTAINING SUCH ARTIFICIAL GRAPHITE, AND ELECTRIC APPARATUS", which is incorporated herein by reference in its entirety.

TECHNICAL FIELD

This application relates to the field of secondary battery technologies, and in particular, to artificial graphite and a preparation method thereof, a secondary battery containing such artificial graphite as a negative electrode active material, and an electric apparatus.

BACKGROUND

Secondary batteries are widely applied due to their outstanding characteristics such as high energy density, zero pollution, and long service life.

In secondary batteries, artificial graphite has been widely used as a negative electrode active substance. However, existing artificial graphite can neither fully satisfy a requirement of batteries with high energy density nor satisfy a high requirement on service life. Therefore, it is necessary to provide a new artificial graphite material capable of further increasing energy density without influencing service life of a battery.

SUMMARY

This application has been made in view of the foregoing issues. An objective of this application is to provide artificial graphite capable of implementing high energy density and long service life, a preparation method thereof, and a negative electrode plate prepared by using such artificial graphite as a negative electrode active material. Further, another objective of this application is to provide a secondary battery with high energy density and long service life and a battery module, a battery pack, and an electric apparatus including such secondary battery.

To achieve the foregoing objectives, the present invention provides the following technical solutions.

A first aspect of this application provides an artificial graphite material A. The artificial graphite material A is secondary particles, where a surface roughness $\eta_A$ of the artificial graphite material A satisfies $6 \le \eta_A \le 12$. In some embodiments, the artificial graphite material A satisfies $7 \le \eta_A \le 10$.

In some embodiments, a true density of the artificial graphite material A is $\rho_A \ge 2.20$ g/cm$^3$, and optionally $\rho_A \ge 2.25$ g/cm$^3$.

In some embodiments, a median particle size by volume $D_v50_A$ of the artificial graphite material A satisfies $D_v50_A \ge 10$ μm, and optionally 12 μm$\le D_v50_A \le$20 μm.

In some embodiments, a specific surface area of the artificial graphite material A is 1.5-4.0, and optionally 2.5-3.5.

In some embodiments, a tap density of the artificial graphite material A is 0.8-1.4, and optionally 0.9-1.1.

In some embodiments, a graphitization degree of the artificial graphite material A is greater than 92%, and optionally 94%-97%.

In some embodiments, a gram capacity of the artificial graphite material A is greater than 340 mAh/g, and optionally 350-360 mAh/g.

A second aspect of this application provides an artificial graphite material B. The artificial graphite material B is primary particles, where a surface roughness $\eta_B$ of the artificial graphite material B satisfies $2.5 \le \eta_B \le 5$.

In some embodiments, the artificial graphite material B satisfies $3 \le \eta_B \le 4$.

In some embodiments, a true density of the artificial graphite material B is $\rho_B \ge 2.20$ g/cm$^3$, and optionally $\rho_B \ge 2.25$ g/cm$^3$.

In some embodiments, a median particle size by volume $D_v50_B$ of the artificial graphite material B satisfies $D_v50_B \le 15$ μm, and optionally 5 μm$\le D_v50_B \le$12 μm.

In some embodiments, a specific surface area of the artificial graphite material B is 0.5-3.0, and optionally 1.0-2.5.

In some embodiments, a tap density of the artificial graphite material B is 0.8-1.4, and optionally 1.1-1.3.

In some embodiments, a graphitization degree of the artificial graphite material B is greater than 91%, and optionally 92%-94%.

In some embodiments, a gram capacity of the artificial graphite material B is greater than 340 mAh/g, and optionally 340-350 mAh/g.

A third aspect of this application provides a preparation method of artificial graphite material A, including the following steps in sequence:

(A1) providing a raw material, and performing crushing and shaping;

(A2) performing granulation;

(A3) performing graphitization treatment; and (A4) performing surface roughening treatment to obtain the artificial graphite material A;

where the artificial graphite material A is secondary particles, and a surface roughness $\eta_A$ of the artificial graphite material A satisfies $6 \le \eta_A \le 12$.

For the preparation method of artificial graphite material A, in some embodiments, a surface roughness $\eta_A$ of the secondary particle before graphitization treatment is 4-6.

For the preparation method of artificial graphite material A, in some embodiments, the performing surface roughening treatment includes:

placing a material in a fusion machine and performing treatment at a specified rotating speed, where the specified rotating speed is 500-1000 r/m, and optionally 600-800 r/m; and a time for the treatment is 3-60 min, and optionally 5-20 min.

For the preparation method of artificial graphite material A, in some embodiments, the performing surface roughening treatment includes:

placing a material in a granulation kettle and continuously injecting dry air; and increasing temperature to a treatment temperature and performing treatment at the treatment temperature, where the treatment temperature is 300-800° C., and optionally 400-600° C.; and a time for the treatment is 1-8 h, and optionally 2-4 h.

A fourth aspect of the present invention provides a preparation method of artificial graphite material B, including the following steps in sequence:

(B1) providing a raw material, and performing crushing and shaping;

(B2) performing graphitization treatment; and (B3) performing surface roughening treatment to obtain the artificial graphite material;

where the artificial graphite material B is primary particles, and a surface roughness $\eta_B$ of the artificial graphite material B satisfies $2.5 \leq \eta_B \leq 5$.

For the preparation method of artificial graphite material B, in some embodiments, a surface roughness of the primary particle before graphitization treatment is 1.5-3.

For the preparation method of artificial graphite material B, in some embodiments, the performing surface roughening treatment includes:

placing a material in a fusion machine and performing treatment at a specified rotating speed, where the specified rotating speed is 800-1000 r/m, and optionally 850-950 r/m; and a time for the treatment is 20-60 min, and optionally 30-50 min.

For the preparation method of artificial graphite material B, in some embodiments, the performing surface roughening treatment includes:

placing a material in a granulation kettle and continuously injecting dry air; and increasing temperature to a treatment temperature and performing treatment at the treatment temperature, where the treatment temperature is 300-800° C., and optionally 400-600° C.; and a time for the treatment is 1-8 h, and optionally 2-4 h.

A fifth aspect of this application provides a secondary battery. The secondary battery includes a negative electrode plate, where the negative electrode plate includes a negative electrode active material; the negative electrode active material includes the artificial graphite material A in this application and/or the artificial graphite material B in this application; or the negative electrode active material includes the artificial graphite material A and/or B prepared by using the method provided in the third aspect and/or the fourth aspect of this application.

A sixth aspect of this application provides an electric apparatus, including the secondary battery provided in the fifth aspect of this application.

In the secondary battery provided in this application, the negative electrode active material includes the artificial graphite material A and/or the artificial graphite material B, and preferably includes both the artificial graphite material A and the artificial graphite material B. The surface roughness of graphite is properly set for the artificial graphite material A and the artificial graphite material B in this application, so as to increase a binding force between graphite and a binder and an acting force between particles of graphite, thereby reducing bounce at the instant that rollers are discharged after cold pressing, and prolonging service life and enhancing safety performance of the secondary battery. In addition, the increased binding force between graphite and the binder and the increased acting force between the particles of graphite helps implement a high energy density. The battery module, the battery pack, and the electric apparatus in this application include the secondary battery provided in this application, and therefore have at least advantages the same as those of the secondary battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
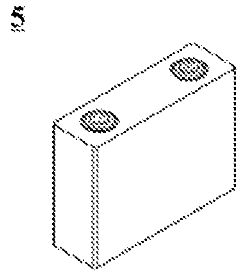
FIG. 1 is a schematic diagram of a secondary battery according to an embodiment of this application.

Reference signs are as follows:

1. battery pack; 2. upper box body; 3. lower box body; 4. battery module; and 5. secondary battery.

DESCRIPTION OF EMBODIMENTS

The following specifically discloses embodiments of composite artificial graphite and a preparation method thereof, a secondary battery, a battery module, a battery pack, and an electric apparatus in this application with appropriate reference to detailed descriptions of accompanying drawings. However, unnecessary detailed descriptions may be omitted. For example, detailed descriptions for well-known matters or overlapping descriptions for actual identical structures have been omitted. This is to avoid unnecessary cumbersomeness of the following descriptions, to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in such method may or may not include end values, and any combination may be used, to be specific, any lower limit may be combined with any upper limit to form a range. For example, if ranges of 60-120 and 80-110 are provided for a specified parameter, it should be understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise specified, a numerical range of "a-b" is an abbreviated representation of any combination of real numbers from a to b, where both a and b are real numbers. For example, a numerical range of "0-5" means that all real numbers in the range of "0-5" are listed herein, and "0-5" is just an abbreviated representation of a combination of these numbers. In addition, when a parameter is expressed as an integer greater than or equal to 2, it is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, "include" and "contain" mentioned in this application are inclusive or may be exclusive. For example, terms "include" and "contain" can mean that other unlisted components may also be included or contained, or only listed components may be included or contained.

In the descriptions of this specification, it should be noted that "more than" or "less than" is inclusive of the present number and that "more" in "one or more" means two or more than two, unless otherwise specified.

As an economical, practical, clean, easily controllable, and easily convertible form of energy, electrical energy is increasingly used in various electric apparatuses. Secondary batteries become preferred power sources of electric apparatuses due to their advantages such as high energy density, ease of carry, no memory effect, and environmental friendliness. A secondary battery using existing natural graphite or artificial graphite as a negative electrode active substance has an energy density not high enough to fully satisfy a requirement of high energy density and satisfy a high service life requirement. Therefore, how to further increase energy density of secondary batteries and further prolong service life of the secondary batteries has become a focus in the field of secondary battery technologies.

Through a lot of researches, the inventors have noted that with an artificial graphite material being made into secondary particles or primary particles and a surface roughness of the artificial graphite material being set to a specified value, a negative electrode active material being prepared by using the artificial graphite material helps a secondary battery to maintain a high energy density and also helps prolong service life and enhance safety performance of the secondary battery and a battery module, a battery pack, and an electric apparatus containing such secondary battery.

[Artificial Graphite Material a and Preparation Method Thereof]

A first aspect of this application provides an artificial graphite material A. The artificial graphite material A is secondary particles, where a surface roughness $\eta_A$ of the artificial graphite material A satisfies $6 \leq \eta_A \leq 12$, and preferably $7 \leq \eta_A \leq 10$. An appropriate surface roughness $\eta_A$ of the artificial graphite material A can increase a binding force between graphite and a binder and an acting force between particles of graphite, thereby reducing bounce at the instant that rollers are discharged after cold pressing, and prolonging service life and enhancing safety performance of a secondary battery. In addition, the increased binding force between graphite and the binder and the increased acting force between the particles of graphite help implement a high energy density.

In some embodiments, a true density of the artificial graphite material A in this application is $\rho_A \geq 2.20$ g/cm$^3$, and optionally $\rho_A \geq 2.25$ g/cm$^3$. The artificial graphite material A with an appropriate true density can have a higher gram capacity, so as to help increase gram capacity of composite artificial graphite and suppress side reactions during cycling, thereby prolonging service life and enhancing safety performance of a secondary battery.

In some embodiments, a median particle size by volume $D_v50_A$ of the artificial graphite material A in this application satisfies $D_v50_A \geq 10$ μm, and optionally 12 μm$\leq D_v50_A \leq 20$ μm. An appropriate median particle size by volume of the artificial graphite material A can enable the artificial graphite material A to have a high gram capacity, thereby helping increase gram capacity of composite artificial graphite, suppressing side reactions during cycling, and prolonging service life and enhancing safety performance of the secondary battery.

In some embodiments, a specific surface area of the artificial graphite material A in this application is 1.5-4.0, and optionally 2.5-3.5. An excessively large specific surface area of the artificial graphite material A leads to high surface reaction activity, proneness to side reactions during cycling, and shorter service life. An excessively small specific surface area of the artificial graphite material A leads to fewer surface active sites and poor power performance of the material.

In some embodiments, a tap density of the artificial graphite material A in this application is 0.8-1.4, and optionally 0.9-1.1. The artificial graphite material A with a low tap density causes a slurry to have poor stability and difficulties in processing. An upper limit of the tap density of the artificial graphite material A is not particularly limited and may be set depending on an achievable degree in a conventional method.

In some embodiments, a graphitization degree of the artificial graphite material A in this application is greater than 92%, and optionally 94%-97%. An excessively low graphitization degree of the artificial graphite material A leads to a low capacity, and an excessively high graphitization degree of the artificial graphite material A leads to a narrow interlayer spacing and a high cycling swelling rate.

In some embodiments, a gram capacity of the artificial graphite material A in this application is greater than 340 mAh/g, and optionally 350-360 mAh/g. A higher appropriate gram capacity of the artificial graphite material A leads to a higher energy density of a secondary battery containing the artificial graphite material A. The artificial graphite material A provided in this application has a relatively high gram capacity, so that the secondary battery provided in this application has a high energy density.

A third aspect of this application provides a preparation method of artificial graphite material A, including the following steps in sequence:

(A1) providing a raw material, and performing crushing and shaping;

(A2) performing granulation;

(A3) performing graphitization treatment; and (A4) performing surface roughening treatment to obtain the artificial graphite material;

where the artificial graphite material A is secondary particles, and a surface roughness $\eta_A$ of the artificial graphite material A satisfies $6 \leq \eta_A \leq 12$.

In this application, the raw material in step (A1) may use, for example, one or more of green coke and calcined coke; and preferably, the raw material includes one or more of needle green petroleum coke, non-needle green petroleum coke, needle coal-based green coke, non-needle coal-based green coke, calcined needle coke, and calcined petroleum coke.

In some embodiments, the raw material in step (A1) may be crushed by using a device and method known in the art, for example, using a jet mill, a mechanical mill, or a roller mill. A large quantity of excessively small particles are usually generated during crushing, and sometimes there are also excessively large particles. Therefore, after crushing, classification may be performed based on requirements, so as to remove excessively small particles and excessively large particles from the crushed powder. A particle product with relatively good particle size distribution can be obtained after classification, so as to facilitate subsequent shaping and/or granulation processes. Classification may be performed by using a device and method known in the art, for example, a classification screen, a gravity classifier, or a centrifugal classifier.

In some embodiments, in step (A1), the crushed particle product in step (A1) may be shaped by using a device (for example, a shaping machine or another shaping device) and a method known in the art. For example, edges and corners of the resulting particle product are polished, which facilitates subsequent operations and enables the resulting product to have higher stability.

In some embodiments, granulation may be performed in step (A2) by using a device known in the art, for example, a granulator. The granulator typically includes an agitating reactor and a temperature control module for the reactor. Further, a median particle size by volume of the resulting product can be controlled by regulating process conditions such as agitation speed, heating speed, granulation temperature, and cooling speed in the granulation process. For example, conditions during granulation in this application may be set as follows: an agitation speed being 800 r/min-1500 r/min, a heating speed being 8-15° C./min, a granulation temperature being 400° C.-650° C., and a granulation time being 6-10 hours.

In some embodiments, graphitization treatment is performed in step (A3). Graphitization treatment includes high-temperature graphitization treatment and low-temperature graphitization treatment. In some embodiments, treatment may be performed by appropriately selecting any one or two of high-temperature graphitization treatment and low-temperature graphitization treatment based on actual specific requirements; or high-temperature graphitization treatment and/or low-temperature graphitization treatment may be performed repeatedly.

Graphite with an appropriate graphitization degree and graphite interlayer spacing can be obtained through high-temperature graphitization treatment. In some embodiments, a temperature for performing high-temperature graphitization treatment in step (A3) may be 2800° C.-3200° C., for example, 2900° C.-3100° C. or 3000° C.-3200° C. Graphite prepared at an appropriate graphitization temperature can obtain an appropriate graphitization degree and graphite interlayer spacing, so that composite artificial graphite can obtain high structural stability and gram capacity.

Graphite with an appropriate graphitization degree and graphite interlayer spacing can also be obtained through low-temperature graphitization treatment. In some embodiments, a temperature for performing low-temperature graphitization treatment in step (A3) may be 2500° C.-2700° C., for example, 2500° C.-2600° C. or 2600° C.-2700° C. Graphite prepared at an appropriate graphitization temperature can obtain an appropriate graphitization degree and graphite interlayer spacing, so that composite artificial graphite can obtain high structural stability and gram capacity.

For the preparation method of artificial graphite material A, in some embodiments, a surface roughness $\eta_A$ of the secondary particle before graphitization treatment is 4-6.

In some embodiments, the surface roughening treatment in step (A4) includes an approach which is mainly performed by using a physical approach ("approach 1A" for short below), specifically including:

- placing a material in a fusion machine and performing treatment at a specified rotating speed,
- where the specified rotating speed is 500-1000 r/m, and optionally 600-800 r/m; and
- a time for the treatment is 3-60 min, and optionally 5-20 min.

In some embodiments, the surface roughening treatment in step (A4) includes an approach which is mainly performed by a chemical approach ("approach 2A" for short below), specifically including:

- placing a material in a granulation kettle and continuously injecting dry air; and
- increasing temperature to a treatment temperature and performing treatment at the treatment temperature, where the treatment temperature is 300-800° C., and optionally 400-600° C.; and
- a time for the treatment is 1-8 h, and optionally 2-4 h.

In some embodiments, the surface roughening treatment performed in step (A4) may use any one or two of the approach 1A or the approach 2A; or treatment in the approach 1A and/or the approach 2A may be performed repeatedly.

[Artificial Graphite Material B and Preparation Method Thereof]

A second aspect of this application provides an artificial graphite material B. The artificial graphite material B is primary particles, where a surface roughness $\eta_B$ of the artificial graphite material B satisfies $2.5 \le \eta_B \le 5$, and preferably, the surface roughness $\eta_B$ satisfies $3 \le \eta_B \le 4$. An appropriate surface roughness $\eta_B$ of the artificial graphite material B can increase a binding force between graphite and a binder and an acting force between particles of graphite, thereby reducing bounce at the instant that rollers are discharged after cold pressing, and prolonging service life and enhancing safety performance of a secondary battery. In addition, the increased binding force between graphite and the binder and the increased acting force between the particles of graphite help implement a high energy density.

In some embodiments, a true density of the artificial graphite material B is $\rho_B \ge 2.20$ g/cm$^3$, and optionally $\rho_B \ge 2.25$ g/cm$^3$. The artificial graphite material B with an appropriate true density can have a higher gram capacity, so as to help increase gram capacity of composite artificial graphite and suppress side reactions during cycling, thereby prolonging service life and enhancing safety performance of a secondary battery.

In some embodiments, a median particle size by volume $D_v50_B$ of the artificial graphite material B satisfies $D_v50_B \le 15$ μm, and optionally 5 μm$\le D_v50_B \le 12$ μm. An appropriate median particle size by volume of the artificial graphite material B can enable the artificial graphite material B to have a high gram capacity, thereby helping increase gram capacity of composite artificial graphite, suppressing side reactions during cycling, and prolonging service life and enhancing safety performance of a secondary battery.

In some embodiments, a specific surface area of the artificial graphite material B is 0.5-3.0, and optionally 1.0-2.5. An excessively large specific surface area of the artificial graphite material B leads to high surface reaction activity, proneness to side reactions during cycling, and shorter service life. An excessively small specific surface area of the artificial graphite material B leads to fewer surface active sites and poor power performance of the material.

In some embodiments, a tap density of the artificial graphite material B is 0.8-1.4, and optionally 1.1-1.3. The artificial graphite material B with a low tap density causes a slurry to have poor stability and difficulties in processing. An upper limit of the tap density of the artificial graphite material B is not particularly limited and may be set depending on an achievable degree in a conventional method.

In some embodiments, a graphitization degree of the artificial graphite material B is greater than 91%, and optionally 92%-94%. An excessively low graphitization degree of the artificial graphite material B leads to a low capacity, and an excessively high graphitization degree of the artificial graphite material A leads to a narrow interlayer spacing and a high cycling swelling rate.

In some embodiments, a gram capacity of the artificial graphite material B is greater than 340 mAh/g, and optionally 340-350 mAh/g. A higher appropriate gram capacity of the artificial graphite material B leads to a higher energy density of a secondary battery containing the artificial graphite material B. The artificial graphite material B provided in this application has a relatively high gram capacity, so that the secondary battery provided in this application has a high energy density.

A fourth aspect of this application provides a preparation method of artificial graphite material B, including the following steps in sequence:

(B1) providing a raw material, and performing crushing and shaping;

(B2) performing graphitization treatment; and (B3) performing surface roughening treatment to obtain the artificial graphite material B;

where the artificial graphite material B is primary particles, and a surface roughness $\eta_B$ of the artificial graphite material B satisfies $2.5 \le \eta_B \le 5$.

In this application, the raw material in step (B1) may use, for example, one or more of green coke and calcined coke; and preferably, the raw material includes one or more of needle green petroleum coke, non-needle green petroleum coke, needle coal-based green coke, non-needle coal-based green coke, calcined needle coke, and calcined petroleum coke.

In some embodiments, the raw material in step (B1) may be crushed by using a device and method known in the art, for example, using a jet mill, a mechanical mill, or a roller mill. A large quantity of excessively small particles are usually generated during crushing, and sometimes there are also excessively large particles. Therefore, after crushing, classification may be performed based on requirements, so as to remove excessively small particles and excessively large particles from the crushed powder. A particle product with relatively good particle size distribution can be obtained after classification, so as to facilitate subsequent shaping and/or granulation processes. Classification may be performed by using a device and method known in the art, for example, a classification screen, a gravity classifier, or a centrifugal classifier.

In some embodiments, in step (B1), the crushed particle product in step (B1) may be shaped by using a device (for example, a shaping machine or another shaping device) and a method known in the art. For example, edges and corners of the resulting particle product are polished, which facilitates subsequent operations and enables the resulting product to have higher stability.

In some embodiments, graphitization treatment is performed in step (B2). Graphitization treatment includes high-temperature graphitization treatment and low-temperature graphitization treatment. In some embodiments, treatment may be performed by appropriately selecting any one or two of high-temperature graphitization treatment and low-temperature graphitization treatment based on actual specific requirements; or high-temperature graphitization treatment and/or low-temperature graphitization treatment may be performed repeatedly.

Graphite with an appropriate graphitization degree and graphite interlayer spacing can be obtained through high-temperature graphitization treatment. In some embodiments, a temperature for performing high-temperature graphitization treatment in step (B2) may be 2800° C.-3200° C., for example, 2900° C.-3100° C. or 3000° C.-3200° C. Graphite prepared at an appropriate graphitization temperature can obtain an appropriate graphitization degree and graphite interlayer spacing, so that composite artificial graphite can obtain high structural stability and gram capacity.

Graphite with an appropriate graphitization degree and graphite interlayer spacing can also be obtained through low-temperature graphitization treatment. In some embodiments, a temperature for performing low-temperature graphitization treatment in step (B2) may be 2500° C.-2700° C., for example, 2500° C.-2600° C. or 2600° C.-2700° C. Graphite prepared at an appropriate graphitization temperature can obtain an appropriate graphitization degree and graphite interlayer spacing, so that composite artificial graphite can obtain high structural stability and gram capacity.

For the preparation method of artificial graphite material B, in some embodiments, a surface roughness of the primary particle before graphitization treatment in step (B2) is 1.5-3.

In some embodiments, the surface roughening treatment is performed in step (B3) to obtain the artificial graphite material B.

In some embodiments, the surface roughening treatment in step (B3) includes an approach which is mainly performed by using a physical approach ("approach 1B" for short below), specifically including:

placing a material in a fusion machine and performing treatment at a specified rotating speed, where the specified rotating speed is 800-1000 r/m, and optionally 850-950 r/m; and a time for the treatment is 20-60 min, and optionally 30-50 min.

In some embodiments, the surface roughening treatment in step (B3) includes an approach which is mainly performed by a chemical approach ("approach 2B" for short below), specifically including:

placing a material in a granulation kettle and continuously injecting dry air; and increasing temperature to a treatment temperature and performing treatment at the treatment temperature, where the treatment temperature is 300-800° C., and optionally 400-600° C.; and a time for the treatment is 1-8 h, and optionally 2-4 h.

In some embodiments, the surface roughening treatment performed in step (B3) may use any one or two of the approach 1B or the approach 2B; or treatment in the approach 1B and/or the approach 2B may be performed repeatedly.

[Measurement of Parameters of Artificial Graphite Materials A and B]

In examples and comparative examples in this application, a surface roughness $\eta_A$ of the artificial graphite material A and a surface roughness $\eta_B$ of the artificial graphite material B are obtained by using the following method.

$$\eta = SSA/\sum_{k=0}^{n}\binom{n}{k}\frac{6*V_k}{\rho*D_k},$$

SSA is specific surface area of the artificial graphite material, ρ is true density of the artificial graphite material, test data of $D_k$ and Vk can be directly read out by using a test device laser particle size analyzer (Malvern Master Size 3000), n represents particle size range of the material, and n may be set by the laser particle size analyzer (for example, n=80). $D_K$ represents average particle size of the material within a particle size range (that is, (particle size upper limit+particle size lower limit)/2); and $V_k$ represents percentage by volume of particles within this range in all particles.

In examples and comparative examples in this application, a true density $\rho_A$ of the artificial graphite material A and a true density $\rho_B$ of the artificial graphite material B are determined in accordance with standard GB/T 24586-2009 by using a true density tester (AccuPyc).

In examples and comparative examples in this application, a median particle size by volume $D_v50_A$ of the artificial graphite material A and a median particle size by volume $D_v50_B$ of the artificial graphite material B are determined in accordance with standard GB/T 19077.1-2016 by using the laser particle size analyzer (Malvern Master Size 3000).

Physical definitions of $D_v50_A$ and $D_v50_B$ are as follows:

$D_v50_A$ and $D_v50_B$ represent a corresponding particle size when a cumulative volume distribution percentage of the artificial graphite material reaches 50%.

In examples and comparative examples, specific surface areas of the artificial graphite material A and the artificial graphite material B are measured with reference to GB/T 19587-2017 by using a nitrogen adsorption specific surface area analysis test method and are obtained through calculation by using a BET (Brunauer Emmett Teller) method. The nitrogen adsorption specific surface area analysis test may be performed by using a Tri-Star 3020 specific surface area and pore size analyzer from Micromeritics company in USA.

In examples and comparative examples in this application, tap densities of the artificial graphite material A and the artificial graphite material B are measured with reference to GB/T 5162-2006 by using a powder tap density tester (for example, Bettersize BT-301).

In examples and comparative examples in this application, powder compacted densities of the artificial graphite material A and the artificial graphite material B are measured with reference to GB/T 24533-2009 by using an electronic pressure tester (for example, UTM7305). To be specific, a specific amount M of powder sample under test is placed on a dedicated press mold (a base area is S), and different pressures are set. Each pressure is kept for 30 seconds and then released, and after 10 seconds, a thickness H of powder pressed under this pressure is read out on the device. A compacted density under this pressure is obtained through calculation, and a compacted density of a negative electrode plate material under this pressure is equal to M/(H×S).

A graphite interlayer spacing $d_{002}$ and a graphitization degree are measured by using a method known in the art. For example, the graphitization degree is measured by using an X-ray powder diffractometer (for example, Bruker D8 Discover). For the test, refer to JIS K 0131-1996 and JB/T 4220-2011. A value of $d_{002}$ is obtained through measurement. Then the graphitization degree is calculated according to the following formula: $G=(0.344-d_{002})/(0.344-0.3354)$, where $d_{002}$ is an interlayer spacing measured in nanometers (nm) in a graphite crystal structure.

Gram capacities of the artificial graphite material A and the artificial graphite material B are measured by using a method known in the art. For example, measurement is performed by using the following method.

<Measurement Method of Gram Capacity>

An artificial graphite material prepared, a conductive agent Super P, a thickener (CMC-Na), and a binder (SBR) are uniformly mixed in a solvent deionized water at a mass ratio of 94.5:1.5:1.5:2.5 to obtain a slurry. The slurry prepared is applied to a copper foil current collector and dried in an oven for later use. A metal lithium plate is used as a counter electrode and a polyethylene (PE) film is used as a separator. Ethylene carbonate (EC), ethyl methyl carbonate (EMC), and diethyl carbonate (DEC) are mixed at a volume ratio of 1:1:1, and then LiPF6 is uniformly dissolved in the foregoing solution to obtain an electrolyte, where a concentration of LiPF6 is 1 mol/L. All the parts are assembled into a CR2430-type button battery in a glove box protected by argon.

After being left standing for 12 hours, the button battery obtained is discharged to 0.005 V at a constant current of 0.05 C, left standing for 10 minutes, and then discharged to 0.005 V again at a constant current of 10 μA. Then the button battery obtained is charged to 2 V at a constant current of 0.1 C, and a charge capacity is recorded. A ratio of the charge capacity to mass of composite artificial graphite is the gram capacity of the artificial graphite material prepared.

[Secondary Battery]

A fifth aspect of this application provides a secondary battery. The secondary battery includes any one of artificial graphite materials A according to the first aspect of the present invention and/or any one of artificial graphite materials B according to the second aspect of the present invention.

An embodiment of this application provides a secondary battery. Typically, the secondary battery includes a positive electrode plate, a negative electrode plate, an electrolyte, and a separator. During charging and discharging of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate, mainly preventing short circuit between the positive electrode and the negative electrode and allowing the ions to pass through.

[Negative Electrode Plate]

The negative electrode plate includes a negative electrode current collector and a negative electrode membrane disposed on at least one surface of the negative electrode current collector. In an example, the negative electrode current collector has two back-to-back surfaces in its thickness direction, and the negative electrode membrane is laminated on either or both of the two back-to-back surfaces of the negative electrode current collector.

A material with good conductivity and mechanical strength may be used as the negative electrode current collector to conduct electricity and collect current. In some embodiments, a copper foil may be used as the negative electrode current collector.

The negative electrode membrane includes a negative electrode active material. The negative electrode active material includes any one of artificial graphite materials A provided in the first aspect of this application and/or any one of artificial graphite materials B provided in the second aspect of this application, which can significantly reduce at the instant that rollers are discharged after cold pressing in a manufacturing process of a negative electrode plate including an artificial graphite material, thereby effectively prolonging service life and enhancing safety performance of a secondary battery.

In some embodiments, steps of preparing the negative electrode plate by using any one or more of the artificial graphite materials in this application may include: dissolving a negative electrode active material including any one or more of the artificial graphite materials A and/or B in this application, a binder, and optionally a thickener and conductive agent in a solvent deionized water to obtain a uniform negative electrode slurry, and applying the negative electrode slurry on a negative electrode current collector, followed by processes such as drying and cold pressing, to obtain a negative electrode plate.

In some embodiments, the negative electrode plate further optionally includes other negative electrode active materials used as the negative electrode of the secondary battery. The other negative electrode active materials may be one or more of other graphite materials (for example, other artificial graphite different from that in this application and natural graphite), mesocarbon microbeads (MCMB for short), hard carbon, soft carbon, silicon-based material, and tin-based material.

In some embodiments, the binder may be selected from one or more of polyacrylic acid (PAA), polyacrylic acid sodium (PAAS), polyacrylamide (PAM), polyvinyl alcohol (PVA), styrene butadiene rubber (SBR), sodium alginate (SA), polymethacrylic acid (PMAA), and carboxymethyl chitosan (CMCS).

In some embodiments, the thickener may be sodium carboxymethyl cellulose (CMC-Na).

In some embodiments, the conductive agent used as the negative electrode plate may be selected from one or more of graphite, superconducting carbon, acetylene black, carbon black, Ketjen black, carbon dots, carbon nanotubes, graphene, and carbon nanofiber.

[Positive Electrode Plate]

The positive electrode plate includes a positive electrode current collector and a positive electrode membrane, where the positive electrode membrane is disposed on at least one surface of the positive electrode current collector and includes a positive electrode active material. In an example, the positive electrode current collector has two back-to-back surfaces in its thickness direction, and the positive electrode membrane is laminated on either or both of the two back-to-back surfaces of the negative electrode current collector.

A material with good conductivity and mechanical strength may be used as the positive electrode current collector. In some embodiments, an aluminum foil may be used as the positive electrode current collector.

The positive electrode active material is not limited to any specific type in this application, may use materials that are known in the art and can be used for positive electrodes of secondary batteries, and may be selected by persons skilled in the art based on actual demands.

In some embodiments, the secondary battery may be a lithium-ion secondary battery. The positive electrode active material may be selected from lithium transition metal oxide and modified materials thereof. The modified material may be lithium transition metal oxide modified through doping and/or coating. For example, the lithium transition metal oxide may be selected from one or more of lithium cobalt oxide, lithium nickel oxide, lithium manganese oxide, lithium nickel manganese oxide, lithium nickel cobalt manganese oxide, lithium nickel cobalt aluminum oxide, and olivine-structured lithium-containing phosphate.

In an example, the positive electrode active material of the secondary battery may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}MN_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP), and $LiMnPO_4$.

In some embodiments, the positive electrode membrane further optionally includes a binder. The binder is not limited to any specific type and may be selected by persons skilled in the art based on actual demands. In an example, the binder used for the positive electrode membrane may include one or more of polyvinylidene fluoride (PVDF) and polytetrafluoroethylene (PTFE).

In some embodiments, the positive electrode membrane further optionally includes a conductive agent. The conductive agent is not limited to any specific type and may be selected by persons skilled in the art based on actual demands. In an example, the conductive agent used for the positive electrode membrane may include one or more of graphite, superconducting carbon, acetylene black, carbon black, Ketjen black, carbon dots, carbon nanotubes, graphene, and carbon nanofiber.

[Electrolyte]

The electrolyte conducts ions between the positive electrode plate and the negative electrode plate. The electrolyte is not limited to any specific type in this application and may be selected based on demands. For example, the electrolyte may be in a liquid state, a gel state, or an all-solid-state.

In some embodiments, the electrolyte is an electrolytic solution. The electrolytic solution includes an electrolytic salt and a solvent.

In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)imide), LiTFSI (lithium bis(trifluoromethanesulphonyl)imide), LiTFS (lithium trifluoromethanesulfonate), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoro ethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the electrolytic solution further optionally includes an additive. For example, the additive may include a negative electrode film-forming additive, or may include a positive electrode film-forming additive, or may include an additive capable of improving some performance of the battery, for example, an additive for improving overcharge performance of the battery, an additive for improving high-temperature performance of the battery, or an additive for improving low-temperature performance of the battery.

[Separator]

Secondary batteries using an electrolytic solution and some secondary batteries using a solid electrolyte further include a separator. The separator is disposed between the positive electrode plate and the negative electrode plate to provide separation. The separator is not particularly limited in type in this application and may be any commonly known porous separator with good chemical stability and mechanical stability. In some embodiments, a material of the separator may be selected from one or more of glass fiber, non-woven fabric, polyethylene, polypropylene, and polyvinylidene fluoride. The separator may be a single-layer film or a multilayer composite film. When the separator is a multilayer composite film, each layer may be made of the same or different materials.

[Outer Package]

In some embodiments, the secondary battery may include an outer package that is used for packaging the positive electrode plate, the negative electrode plate, and the electrolyte. In an example, the positive electrode plate, the negative electrode plate, and the separator may be stacked or wound to form a cell having a stacked structure or a cell having a wound structure. The cell is packaged in the outer package. The electrolyte may use an electrolytic solution, and the electrolytic solution infiltrates in the cell. There may be one or more cells in the secondary battery, and the quantity of the cells can be adjusted based on demands.

In some embodiments, the outer package of the secondary battery may be a soft pack, for example, a soft pouch. A material of the soft pack may be plastic, for example, may include one or more of polypropylene PP, polybutylene terephthalate PBT, and polybutylene succinate PBS. Alternatively, the outer package of the secondary battery may be a hard shell, for example, an aluminum shell.

In some embodiments, the positive electrode plate, the negative electrode plate, and the separator may be made into an electrode assembly through winding or stacking.

The secondary battery is not particularly limited in shape in this application and may be cylindrical, rectangular, or of any other shapes. FIG. 1 shows a rectangular secondary battery 5 as an example.

[Battery Module]

According to a sixth aspect of this application, secondary batteries may be assembled into a battery module; and the battery module may include a plurality of secondary batteries, and the specific quantity of secondary batteries may be adjusted based on application and capacity of the battery module.

Figure 2:
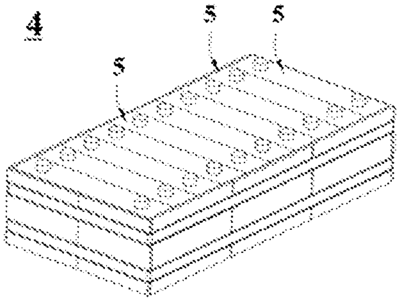
FIG. 2 is a schematic diagram of a battery module according to an embodiment of this application.

FIG. 2 shows a battery module 4 as an example. Referring to FIG. 2, in the battery module 4, a plurality of secondary batteries 5 may be sequentially arranged along a length direction of the battery module 4. Certainly, the secondary batteries 5 may alternatively be arranged in any other manners. Further, the plurality of secondary batteries 5 may be fastened through fasteners.

Optionally, the battery module 4 may further include a housing with an accommodating space, and the plurality of secondary batteries 5 are accommodated in the accommodating space.

[Battery Pack]

According to a sixth aspect of this application, the battery module in this application may be further assembled into a battery pack, and a quantity of battery modules included in a battery pack may be adjusted based on application and capacity of the battery pack.

Figure 3:
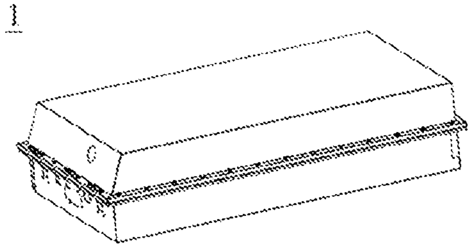
FIG. 3 is a schematic diagram of a battery pack according to an embodiment of this application.
Figure 4:
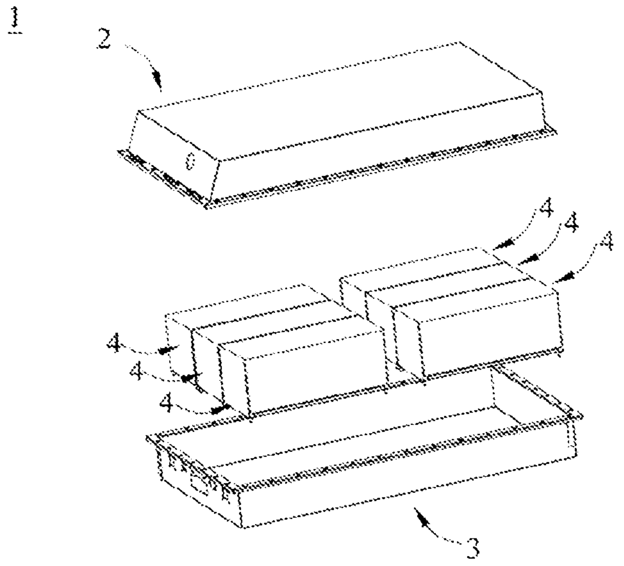
FIG. 4 is an exploded view of FIG. 3.

FIG. 3 and FIG. 4 show a battery pack 1 as an example. Referring to FIG. 3 and FIG. 4, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

[Electric Apparatus]

The sixth aspect of this application further provides an electric apparatus. The electric apparatus includes the secondary battery in this application. The secondary battery supplies power to the electric apparatus. The electric apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The secondary battery, the battery module, or the battery pack may be selected for the electric apparatus based on requirements for using the apparatus.

Figure 5:
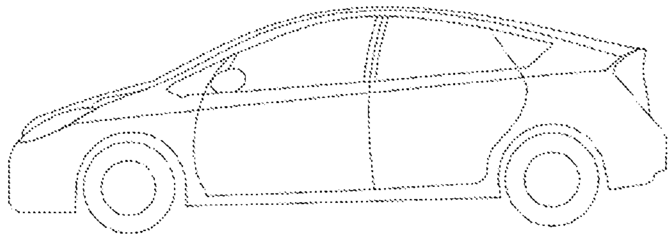
FIG. 5 is a schematic diagram of an electric apparatus according to an embodiment of this application.

FIG. 5 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the electric apparatus may be a mobile phone, a tablet computer, a notebook computer, or the like. Such apparatus is generally required to be light and thin and may use a secondary battery as its power source.

EXAMPLES

The following describes examples in this application. The examples described below are exemplary and only used to explain this application, but cannot be understood as limitations on this application. Examples whose technical solutions or conditions are not specified are made based on technical solutions or conditions described in documents in the art, or made based on the product specification. The reagents or instruments used are all conventional products that can be purchased on the market if no manufacturer is indicated.

Example 1a

Preparation of Artificial Graphite Material A:

(A1): A calcined needle coke raw material was crushed by using a roller mill, and classification and shaping were performed by using a centrifugal separator and a shaping machine respectively to obtain a precursor 1.

(A2): The precursor 1 obtained in step (A1) was granulated to obtain an intermediate 1; a binder was added during granulating, where an amount of the binder added was 15% of the weight of the precursor 1 used in granulation step (A2); and a granulator was used for granulating, where an agitation speed was 1000 r/min, a heating speed was 10° C./min, a granulation temperature was 650° C., and a granulation time was 8 hours.

(A3): Graphitization treatment was performed on the intermediate 1 obtained in step (A2) at a temperature of 3000° C.

(A4): A product obtained in step (A3) was placed in a granulation kettle, and dry air was continuously injected; and temperature was increased to 550° C. at a heating speed of 5° C./min, and the treatment temperature was kept for 2 h to obtain an artificial graphite material A. The artificial graphite material A was secondary particles, and a surface roughness thereof was 8.5.

Preparation of Negative Electrode Plate

The artificial graphite material A prepared, a conductive agent Super P, a binder SBR, and a thickener CMC-Na were mixed at a mass ratio of 96.2:0.8:1.8:1.2 and fully stirred in an appropriate amount of deionized water to form a uniform negative electrode slurry. The negative electrode slurry was applied to a surface of a negative electrode current collector copper foil, followed by drying and cold pressing (a pressure for cold pressing was 70 ton, and a cold pressing speed was 35 m/s) to obtain a negative electrode plate. A negative electrode membrane had a surface density of 10.7 mg/cm$^2$ and a compacted density of 1.71 g/cm$^3$.

Preparation of Positive Electrode Plate

A positive electrode active material $LiNi_{0.5}Co_{0.2}Mn_{0.3}O_2$ (NCM523), a conductive agent (Super P), and a binder PVDF were fully stirred and mixed in an appropriate amount of NMP at a weight ratio of 96.2:2.7:1.1 to form a uniform positive electrode slurry. The positive electrode slurry was applied to a surface of a positive electrode current collector aluminum foil, followed by drying and cold pressing to obtain a positive electrode plate. The positive electrode plate had a compacted density of 3.45 g/cm$^3$ and a surface density of 18.8 mg/cm$^2$.

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L.

Separator

A polyethylene (PE) film was used.

Preparation of Secondary Battery

The positive electrode plate, the separator, and the negative electrode plate were stacked in sequence and wound to obtain an electrode assembly. The electrode assembly was placed in an outer package. The electrolyte was injected, followed by processes such as packaging, standing, formation, and aging to obtain a secondary battery.

Examples 2a to 17a and Comparative Examples 1a and 2a

Examples 2a to 17a and Examples 1a and 2a were substantially the same as Example 1a, except for differences shown in Tables 1 to 3. Examples 2a to 17a and Comparative Examples 1a and 2a were the same as Example 1a unless otherwise explicitly indicated in Tables 1 to 3.

Test results of artificial graphite materials obtained in Examples 1a to 13a and Comparative Examples 1a to 5a are shown in Tables 1 to 3.

In Table 1, the treatment approach of step (A4) being "chemical" indicates that step (A4) was performed in the following manner: a material was placed in a granulation kettle and dry air was continuously injected; and temperature was increased to a specified treatment temperature at 5° C./min, and the treatment temperature was kept constant for a specified time. The treatment temperature and a treatment time (that is, a time for keeping temperature constant) are shown in Table 1.

In Table 1, the treatment approach of step (A4) being "physical" indicates that step (A4) was performed in the following manner: a material was placed in a fusion machine and treated at a specified rotating speed. The rotating speed and a treatment time are shown in Table 1.

<Performance Test>

(1) A method for measuring compacted density of negative electrode membrane after cold pressing is described below.

The negative electrode plate in the foregoing examples and comparative examples was taken and punched into a small disc with an area of S1 (the area S1 was measured in cm$^2$); and the small disc was weighed and its weight was recorded as M1 (M1 was measured in g).

Thickness of a negative electrode membrane was measured (that is, thickness of a negative electrode film layer on any one surface of a negative electrode current collector was measured, where the thickness was measured in cm).

The negative electrode membrane of the weighed negative electrode plate was wiped off, and the negative electrode collector was weighed and its weight was recorded as M0 (M0 was measured in g). With the negative electrode membrane being only disposed on one surface of the negative electrode current collector, the weight of the negative electrode membrane was equal to M1-M0; and with the negative electrode membrane being disposed on both surfaces of the negative electrode current collector, the weight of the negative electrode membrane was equal to (M1−M0)/2.

The surface density of the negative electrode membrane=the weight of the negative electrode membrane/S1.

Based on "the surface density of the negative electrode membrane" and "the thickness of the negative electrode membrane", "the compacted density of the negative electrode membrane after cold pressing" was obtained using the following formula and recorded in the following tables.

The compacted density of the negative electrode membrane after cold pressing=the surface density of the negative electrode membrane/the thickness of the negative electrode membrane.

(2) A method for measuring compacted density and cycling swelling rate of negative electrode membrane after cycling is described below.

The secondary battery prepared in the examples and comparative examples was charged to a charge cutoff voltage of 4.2 V at a constant current of 1 C, then charged at a constant voltage until current was ≤0.05 C, left standing for 5 minutes, then discharged to a discharge cutoff voltage of 2.8 V at a constant current of 1 C, and left standing for 5 minutes. This was one charge and discharge cycle. The battery was tested in the method for 600 charge and discharge cycles. The negative electrode plate was disassembled. Test was performed with reference to the steps of the given method 1. Then the compacted density of the negative electrode membrane after cycling was obtained and recorded in the following tables.

Based on "the compacted density of the negative electrode membrane after cold pressing" and "the compacted density of the negative electrode membrane after cycling", "the cycling swelling rate (600 cys) of the negative electrode membrane" was obtained using the following formula and recorded in the following tables.

The cycling swelling rate (600 cys) of the negative electrode membrane=(the compacted density of the negative electrode membrane after cold pressing/the compacted density of the negative electrode membrane after cycling−1)×100%, where the compacted density of the negative electrode membrane after cold pressing is a test result in the method 1.

TABLE 1

| Secondary particles | Process parameters of step (A4): Treatment approach of step (A4) | Treatment condition of step (A4) | Treatment time of step (A4) | Material morphology or parameter: Morphology | $\eta_A$ | Battery parameters: Compacted density of negative electrode membrane after cold pressing | Compacted density of negative electrode membrane after cycling (600 cys) | Cycling swelling rate of negative electrode membrane (600 cys) |
|---|---|---|---|---|---|---|---|---|
| Example 1a | Chemical | 550° C. | 2 h | Secondary particles | 8.5 | 1.712 | 1.345 | 27.3% |
| Example 2a | Chemical | 400° C. | 1 h | Secondary particles | 6.0 | 1.684 | 1.303 | 29.2% |
| Example 3a | Chemical | 400° C. | 2 h | Secondary particles | 7.0 | 1.692 | 1.317 | 28.5% |
| Example 4a | Physical | 800 r/m | 10 min | Secondary particles | 10.0 | 1.721 | 1.350 | 27.5% |
| Example 5a | Physical | 800 r/m | 20 min | Secondary particles | 11.0 | 1.726 | 1.326 | 30.2% |
| Example 6a | Physical | 1000 r/m | 20 min | Secondary particles | 12.0 | 1.723 | 1.303 | 32.2% |
| Comparative Example 1a | N/A | / | / | Secondary particles | 4.5 | 1.657 | 1.252 | 32.3% |
| Comparative Example 2a | Physical | 1200 r/m | 60 min | Secondary particles | 20.0 | 1.719 | 1.234 | 39.3% |

TABLE 2

| Secondary particles | Material morphology or parameter: Morphology | $\eta_A$ | True density $\rho_A$ (g/cm$^3$) | Electrical performance data: Compacted density of negative electrode membrane after cold pressing | Compacted density of negative electrode membrane after cycling (600 cys) | Cycling swelling rate of negative electrode membrane (600 cys) |
|---|---|---|---|---|---|---|
| Example 1a | Secondary particles | 8.5 | 2.26 | 1.712 | 1.345 | 27.3% |
| Example 7a | Secondary particles | 8.5 | 2.25 | 1.712 | 1.343 | 27.5% |
| Example 8a | Secondary particles | 8.5 | 2.22 | 1.705 | 1.333 | 27.9% |
| Example 9a | Secondary particles | 8.5 | 2.20 | 1.689 | 1.327 | 27.3% |
| Example 10a | Secondary particles | 8.5 | 2.18 | 1.669 | 1.301 | 28.3% |

TABLE 3

| | Material morphology or parameter: Morphology | $\eta_A$ | Median particle size by volume $D_v50_A$ (μm) | Electrical performance data: Compacted density of negative electrode membrane after cold pressing | Compacted density of negative electrode membrane after cycling (600 cys) | Cycling swelling rate of negative electrode membrane (600 cys) |
|---|---|---|---|---|---|---|
| Example 1a | Secondary particles | 8.5 | 18 | 1.712 | 1.345 | 27.3% |
| Example 11a | Secondary particles | 8.5 | 10 | 1.680 | 1.321 | 27.2% |
| Example 12a | Secondary particles | 8.5 | 12 | 1.687 | 1.329 | 26.9% |
| Example 13a | Secondary particles | 8.5 | 14 | 1.690 | 1.327 | 27.4% |
| Example 14a | Secondary particles | 8.5 | 16 | 1.703 | 1.339 | 27.2% |
| Example 15a | Secondary particles | 8.5 | 20 | 1.715 | 1.349 | 27.1% |
| Example 16a | Secondary particles | 8.5 | 8 | 1.663 | 1.310 | 26.9% |
| Example 17a | Secondary particles | 8.5 | 22 | 1.723 | / | Cyclic lithium precipitation |

Example 1b

Preparation of Artificial Graphite Material B:

(B1): A green petroleum coke raw material was crushed by using a mechanical mill, and classification and shaping were performed by using a centrifugal separator and a shaping machine to obtain a precursor 1.

(B2): Graphitization treatment was performed on the precursor 1 obtained in step (B1) at a temperature of 3000° C.

(B3): A product obtained in step (B2) was placed in a fusion machine and treated for 30 minutes at 1000 r/m to obtain an artificial graphite material B. The artificial graphite material B was primary particles, and a surface roughness thereof was 3.5.

Preparation of Negative Electrode Plate

The artificial graphite material B prepared, a conductive agent Super P, a binder SBR, and a thickener CMC-Na were mixed at a mass ratio of 96.2:0.8:1.8:1.2 and fully stirred in an appropriate amount of deionized water to form a uniform negative electrode slurry. The negative electrode slurry was applied to a surface of a negative electrode current collector copper foil, followed by drying and cold pressing to obtain a negative electrode plate. A negative electrode membrane had a surface density of 10.7 $mg/cm^2$ and a compacted density of 1.67 $g/cm^3$.

Preparation of Positive Electrode Plate

A positive electrode active material $LiNi_{0.5}Co_{0.2}Mn_{0.3}O_2$ (NCM523), a conductive agent (Super P), and a binder PVDF were fully stirred and mixed in an appropriate amount of NMP at a weight ratio of 96.2:2.7:1.1 to form a uniform positive electrode slurry. The positive electrode slurry was applied to a surface of a positive electrode current collector aluminum foil, followed by drying and cold pressing to obtain a positive electrode plate. The positive electrode plate had a compacted density of 3.45 $g/cm^3$ and a surface density of 18.8 $mg/cm^2$.

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L.

Separator

A polyethylene (PE) film was used.

Preparation of Secondary Battery

The positive electrode plate, the separator, and the negative electrode plate were stacked in sequence and wound to obtain a cell. The cell was placed in an outer package, and the electrolyte was injected, followed by processes such as packaging, standing, formation, and aging to obtain a secondary battery.

Examples 2b to 17b and Comparative Examples 1b and 2b

Examples 2b to 14b and Comparative Examples 1b and 2b were substantially the same as Example 1b, except for the differences shown in Tables 4 to 6. Examples 2b to 17b and Comparative Examples 1b and 2b were the same as Example 1b unless otherwise explicitly indicated in Tables 4 to 6.

Test results of artificial graphite materials obtained in Examples 1b to 17b and Comparative Examples 1b and **2*b*** are shown in Tables 4 to 6.

In Table 4, the treatment approach of step (B3) being “chemical” indicates that step (B3) was performed in the following manner: a material was placed in a granulation kettle and dry air was continuously injected; and temperature was increased to a specified treatment temperature at 5° C./min, and the treatment temperature was kept constant for a specified time. The treatment temperature and a treatment time (that is, a time for keeping temperature constant) are shown in Table 4.

In Table 4, the treatment approach of step (B3) being “physical” indicates that step (B3) was performed in the following manner: a material was placed in a fusion machine and treated at a specified rotating speed. The rotating speed and a treatment time are shown in Table 4.

TABLE 4

| | Process parameters of step (B3) | | | Material morphology or parameter | | Electrical performance data | | |
|---|---|---|---|---|---|---|---|---|
| | Treatment approach of step (B3) | Treatment condition of step (B3) | Treatment time of step (B3) | Morphology | $\eta_B$ | Compacted density of negative electrode membrane after cold pressing | Compacted density of negative electrode membrane after cycling (600 cys) | Cycling swelling rate of negative electrode membrane (600 cys) |
| Example 1b | Physical | 900 r/m | 30 min | Primary particles | 3.5 | 1.667 | 1.341 | 24.3% |
| Example 2b | Chemical | 400° C. | 1 h | Primary particles | 2.5 | 1.653 | 1.301 | 27.1% |
| Example 3b | Chemical | 400° C. | 2 h | Primary particles | 3.0 | 1.658 | 1.327 | 24.9% |
| Example 4b | Chemical | 500° C. | 2 h | Primary particles | 3.5 | 1.673 | 1.347 | 24.2% |
| Example 5b | Physical | 900 r/m | 50 min | Primary particles | 4.0 | 1.679 | 1.335 | 25.8% |
| Example 6b | Physical | 1000 r/m | 50 min | Primary particles | 5.0 | 1.683 | 1.303 | 29.2% |
| Comparative Example 1b | N/A | / | / | Primary particles | 2.0 | 1.598 | 1.223 | 30.7% |
| Comparative Example 2b | Physical | 1200 r/m | 60 min | Primary particles | 8.0 | 1.692 | 1.251 | 35.2% |

TABLE 5

| | Material morphology or parameter | | | Electrical performance data | | |
|---|---|---|---|---|---|---|
| | Morphology | $\eta_B$ | True density $\rho_B$ (g/cm$^3$) | Compacted density of negative electrode membrane after cold pressing | Compacted density of negative electrode membrane after cycling (600 cys) | Cycling swelling rate of negative electrode membrane (600 cys) |
| Example 1b | Primary particles | 3.5 | 2.26 | 1.667 | 1.341 | 24.3% |
| Example 7b | Primary particles | 3.5 | 2.25 | 1.673 | 1.347 | 24.2% |
| Example 8b | Primary particles | 3.5 | 2.22 | 1.669 | 1.345 | 24.1% |
| Example 9b | Primary particles | 3.5 | 2.20 | 1.657 | 1.321 | 25.4% |
| Example 10b | Primary particles | 3.5 | 2.18 | 1.660 | 1.308 | 26.9% |

TABLE 6

| | Material morphology or parameter | | | Electrical performance data | | |
|---|---|---|---|---|---|---|
| | Morphology | $\eta_B$ | Median particle size by volume $D_v50_A$ (μm) | Compacted density of negative electrode membrane after cold pressing | Compacted density of negative electrode membrane after cycling (600 cys) | Cycling swelling rate of negative electrode membrane (600 cys) |
| Example 1b | Primary particles | 3.5 | 9 | 1.667 | 1.341 | 24.3% |
| Example 11b | Primary particles | 3.5 | 5 | 1.645 | 1.326 | 24.1% |
| Example 12b | Primary particles | 3.5 | 7 | 1.660 | 1.337 | 24.2% |
| Example 13b | Primary particles | 3.5 | 11 | 1.687 | 1.357 | 24.3% |
| Example 14b | Primary particles | 3.5 | 12 | 1.692 | 1.359 | 24.5% |
| Example 15b | Primary particles | 3.5 | 15 | 1.691 | 1.352 | 25.1% |
| Example 16b | Primary particles | 3.5 | 4 | 1.612 | 1.301 | 23.9% |
| Example 17b | Primary particles | 3.5 | 18 | 1.709 | / | Cyclic lithium precipitation |

Example 1c

Preparation of Negative Electrode Plate

The artificial graphite material A prepared in Example 1a, the artificial graphite material B prepared in Example 1b, a conductive agent Super P, a binder SBR, and a thickener CMC-Na were mixed at a mass ratio of 48.1:48.1:0.8:1.8:1.2 and fully stirred in an appropriate amount of deionized water to form a uniform negative electrode slurry. The negative electrode slurry was applied to a surface of a negative electrode current collector copper foil, followed by drying and cold pressing to obtain a negative electrode plate. A negative electrode membrane had a surface density of 10.7 mg/cm$^2$ and a compacted density of 1.71 g/cm$^3$.

Preparation of Positive Electrode Plate

A positive electrode active material $LiNi_{0.5}Co_{0.2}Mn_{0.3}O_2$ (NCM523), a conductive agent (Super P), and a binder PVDF were fully stirred and mixed in an appropriate amount of NMP at a weight ratio of 96.2:2.7:1.1 to form a uniform positive electrode slurry. The positive electrode slurry was applied to a surface of a positive electrode current collector aluminum foil, followed by drying and cold pressing to obtain a positive electrode plate. The positive electrode plate had a compacted density of 3.45 g/cm$^3$ and a surface density of 18.8 mg/cm$^2$.

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L.

Separator

A polyethylene (PE) film was used.

Preparation of Secondary Battery

The positive electrode plate, the separator, and the negative electrode plate were stacked in sequence and wound to obtain a cell. The cell was placed in an outer package, and the electrolyte was injected, followed by processes such as packaging, standing, formation, and aging to obtain a secondary battery.

TABLE 7

| | Particle morphology | Compacted density of negative electrode membrane after cold pressing | Compacted density of negative electrode membrane after cycling (600cys) | Cycling swelling rate of negative electrode membrane (600cys) |
|---|---|---|---|---|
| Example 1c | Mixture of secondary particles and primary particles | 1.71 | 1.38 | 24% |

The invention claimed is:

1. An artificial graphite material A used as a negative electrode active material for a secondary battery, wherein the artificial graphite material A is secondary particles, a median particle size by volume Dv50A of the artificial graphite material A is from 10 μm to 20 μm, and a surface roughness $\eta_A$ of the artificial graphite material A satisfies $7 \le \eta_A \le 10$, wherein a tap density of the artificial graphite material A is 0.8-1.4 g/cm$^3$.

2. The artificial graphite material A according to claim 1, wherein a true density of the artificial graphite material A is $\rho_A \ge 2.20$ g/cm$^3$.

3. The artificial graphite material A according to claim 1, wherein a specific surface area of the artificial graphite material A is 1.5-4.0 m$^2$/g.

4. The artificial graphite material A according to claim 1, wherein a graphitization degree of the artificial graphite material A is greater than 92%.

5. The artificial graphite material A according to claim 1, wherein a gram capacity of the artificial graphite material A is greater than 340 mAh/g.

6. A preparation method of artificial graphite material A, comprising the following steps in sequence:

(A1) providing a raw material, and performing crushing and shaping to obtain a crushed particle product;

(A2) performing granulation on the crushed particle product;

(A3) performing graphitization treatment to obtain a graphitization product; and (A4) performing surface roughening treatment on the graphitization product to obtain the artificial graphite material;

wherein the artificial graphite material A is secondary particles, a median particle size by volume Dv50A of the artificial graphite material A is from 10 μm to 20 μm, and a surface roughness of the artificial graphite material A satisfies $7 \le \eta_A \le 10$, and a tap density of the artificial graphite material A is 0.8-1.4 g/cm$^3$.

7. The preparation method of artificial graphite material A according to claim 6, wherein a surface roughness of the crushed particle product before graphitization treatment is 4-6.

8. The preparation method of artificial graphite material A according to claim 6, wherein the performing surface roughening treatment comprises:

placing the graphitization product in a fusion machine and performing treatment at a specified rotating speed, wherein the specified rotating speed is 500-1000 r/m; and a time duration for the treatment is 3-60 min.

9. The preparation method of artificial graphite material A according to claim 6, wherein the performing surface roughening treatment comprises:

placing the graphitization product in a granulation kettle and continuously injecting dry air; and increasing temperature to a treatment temperature and performing treatment at the treatment temperature, wherein the treatment temperature is 300-800° C.; and a time duration for the treatment is 1-8 h.

* * * * *